United States Patent
Faust et al.

(10) Patent No.: US 10,569,965 B2
(45) Date of Patent: Feb. 25, 2020

(54) CONVEYOR SENSOR ARRANGEMENT

(71) Applicant: Packaging Progressions, Inc., Souderton, PA (US)

(72) Inventors: Charles Faust, Bensalem, PA (US); Aaron Taney, Douglassville, PA (US)

(73) Assignee: Packaging Progressions, Inc., Souderton, PA (US)

( * ) Notice: Subject to any disclaimer, the term of this patent is extended or adjusted under 35 U.S.C. 154(b) by 0 days.

(21) Appl. No.: 16/032,624

(22) Filed: Jul. 11, 2018

(65) Prior Publication Data

US 2019/0031445 A1 Jan. 31, 2019

Related U.S. Application Data

(60) Provisional application No. 62/537,740, filed on Jul. 27, 2017.

(51) Int. Cl.
*B65G 43/08* (2006.01)
*B65G 43/10* (2006.01)

(52) U.S. Cl.
CPC .............. *B65G 43/08* (2013.01); *B65G 43/10* (2013.01); *B65G 2203/02* (2013.01); *B65G 2203/042* (2013.01); *B65G 2203/047* (2013.01)

(58) Field of Classification Search
CPC .............. B65G 43/08; B65G 2203/044; B65G 2203/0233
USPC ......................................... 198/502.3, 810.01
See application file for complete search history.

(56) References Cited

U.S. PATENT DOCUMENTS

| 4,530,632 A * | 7/1985 | Sela ...................... A21C 9/086 198/493 |
| 5,303,811 A * | 4/1994 | Haley .................... B65G 47/29 198/419.1 |
| 5,551,550 A * | 9/1996 | Marshall ................ B65G 47/82 198/419.3 |
| 5,740,901 A * | 4/1998 | Lazzarotti ................ B07C 1/02 198/444 |
| 6,488,465 B1 * | 12/2002 | Overington .......... B65G 57/183 414/783 |
| 6,918,736 B2 * | 7/2005 | Hart ......................... B65B 5/10 414/788.9 |
| 7,389,867 B2 * | 6/2008 | Hillmantel ........... B65G 47/244 198/395 |
| 8,086,156 B2 * | 12/2011 | Tao .................... G03G 15/5058 198/806 |
| 2005/0202947 A1 * | 9/2005 | Itoya ........................ B07C 5/34 493/25 |

(Continued)

*Primary Examiner* — Joseph A Dillon, Jr.
(74) *Attorney, Agent, or Firm* — Brinks Gilson & Lione

(57) ABSTRACT

A conveyor sensor arrangement is disclosed. The conveyor sensor arrangement includes a conveyor configured to move a product from a first conveyor end to a second conveyor end in a conveying direction. A plurality of fingers are pivotally arranged on a support that is positioned above the conveyor and that is arranged perpendicular to the conveying direction. Each finger of the plurality of fingers includes a first finger end and a second finger end, and the first finger end extends toward a surface of the conveyor. A single sensor is arranged above the conveyor. Contact between a leading edge of a product moving along the conveyor and at least one of the first finger ends causes a corresponding one of the second finger ends to trigger the sensor.

10 Claims, 3 Drawing Sheets

(56) References Cited

U.S. PATENT DOCUMENTS

| | | | |
|---|---|---|---|
| 2015/0041283 A1* | 2/2015 | Boon | G07F 19/202 198/617 |
| 2015/0129392 A1* | 5/2015 | Taylor, III | B65G 43/08 198/502.2 |
| 2018/0086568 A1* | 3/2018 | Lepage | B65G 43/08 |
| 2018/0215551 A1* | 8/2018 | Thomas | G06Q 10/08 |
| 2019/0291969 A1* | 9/2019 | Faust | B65G 43/08 |

* cited by examiner

CONVEYOR SENSOR ARRANGEMENT

INCORPORATION BY REFERENCE

The following document is incorporated by reference as if fully set forth herein: U.S. Provisional Application No. 62/537,740, filed Jul. 27, 2017.

FIELD OF THE INVENTION

The invention is generally related to a conveyor arrangement, and is more specifically related to a sensor for a conveyor.

BACKGROUND

Conveyors are used in a variety of applications to move an assortment of products. Conveyor arrangements can include a sensor, which is typically either arranged directly above or directly below the conveyor. The sensor typically points directly downward or upward at the conveying surface to detect the position of the product on the conveyor. Products come in a variety of shapes and sizes, and some products do not have a straight leading edge. For example, some types of product have a round leading edge or an angled leading edge. In arrangements with downward and upward facing sensors, it is difficult to determine if a detected leading edge of a round product is the true leading edge of the product, or if the sensor detects a portion of the product which is not the true leading edge of the product. Inaccurate detection of the leading edge of round products can lead to improper handling of the products, disruption of the conveyor arrangement timing, and an overall decrease in efficiency for the conveyor arrangement.

SUMMARY

A conveyor sensor arrangement is disclosed that provides a reliable configuration for detecting a product's specific position. The conveyor sensor arrangement includes a conveyor configured to move a product from a first conveyor end to a second conveyor end in a conveying direction. A plurality of fingers are pivotally arranged on a support that is positioned above the conveyor and arranged perpendicular to the conveying direction. Each finger of the plurality of fingers includes a first finger end and a second finger end, and the first finger ends extend toward a surface of the conveyor. A single sensor is arranged above the conveyor. Contact between a leading edge of a product moving along the conveyor and at least one of the first finger ends causes a corresponding one of the second finger ends to trigger the sensor. The conveyor sensor arrangement provides reliable position detection configuration for products that only requires a single sensor.

In another embodiment, a conveyor sensor arrangement includes a conveyor configured to move a product, a plurality of fingers, and a single sensor, wherein contact between a leading edge of the product moving along the conveyor and at least one of the plurality of fingers triggers the single sensor.

Further details of the invention are explained in detail below and in the claims.

BRIEF DESCRIPTION OF THE DRAWINGS

The foregoing summary as well as the following detailed description will be better understood when read in conjunction with the appended drawings. For the purposes of illustrating the invention, there is shown in the drawings an embodiment which is presently preferred. It should be understood, however, that the invention is not limited to the precise arrangement shown. In the drawings.

DETAILED DESCRIPTION OF THE PREFERRED EMBODIMENTS

Figure 1:
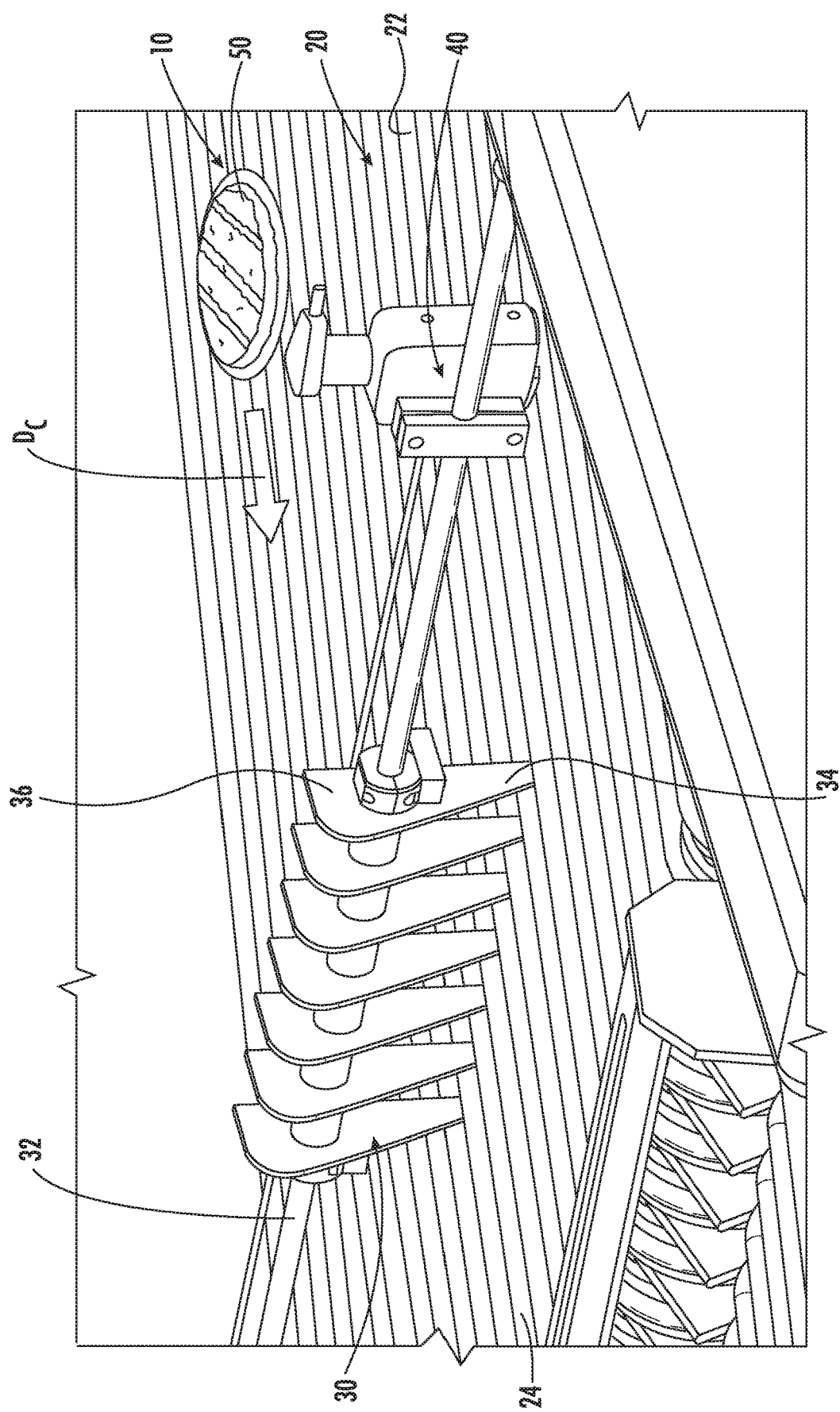
FIG. 1 is a rear perspective view of an embodiment of a conveyor arrangement according to an embodiment.

Certain terminology is used in the following description for convenience only and is not considered limiting. Words such as "left", "right", "front", "back", "top", and "bottom" designate directions in the drawings to which reference is made. This terminology includes the words specifically noted above, derivatives thereof, and words of similar import. Additionally, the terms "a" and "one" are defined as including one or more of the referenced item unless specifically noted. Additionally, a group of items referred to as "at least one of a, b, or c," refers to any one of a, b, or c, or combinations thereof.

Figure 2:
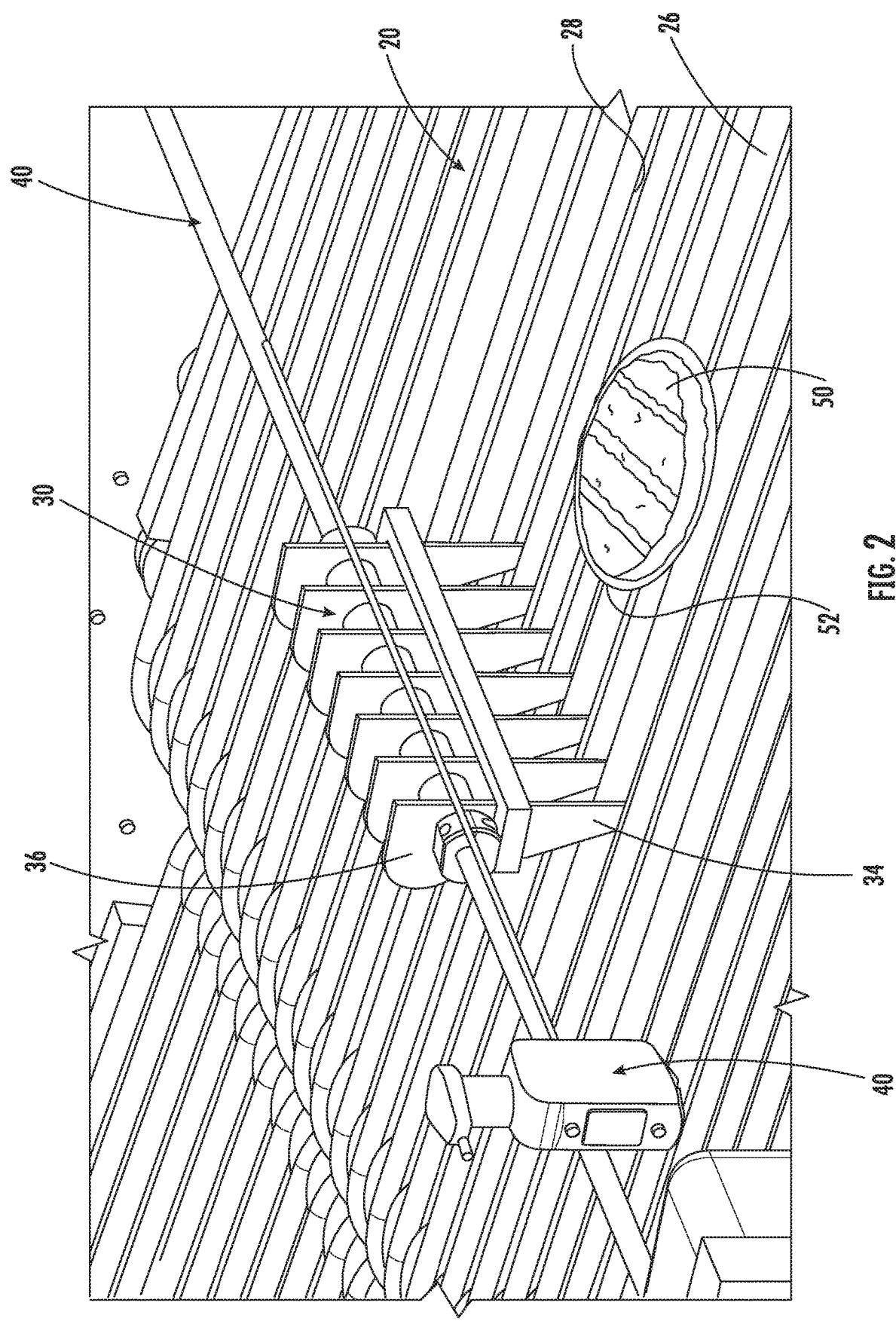
FIG. 2 is a front perspective view of the conveyor arrangement of FIG. 1.

As shown in FIGS. 1 and 2, a conveyor sensor arrangement 10 is illustrated. The conveyor sensor arrangement 10 includes a conveyor 20, a plurality of fingers 30, and a single sensor 40. The conveyor 20 is configured to move a product 50 from a first conveyor end 22 to a second conveyor end 24 in a conveying direction ($D_C$). As shown in FIGS. 1 and 2, the product 50 has a rounded leading edge 52. One of ordinary skill in the art would recognize that the product 50 can have any size, shape, and dimensions. In one embodiment, the conveyor 20 includes a plurality of conveying bands 26 extending between the first conveyor end 22 and the second conveyor end 24. The plurality of conveying bands 26 define a plurality of gaps 28 therebetween. One of ordinary skill in the art would recognize from the present disclosure that alternative types of conveyors could be used, such as belt, pallet, or chain conveyors.

The plurality of fingers 30 are pivotally arranged on a support 32 that is positioned above the conveyor 20 and arranged perpendicular to the conveying direction ($D_C$). The support 32 extends laterally across the conveyor 20. In the embodiment shown in FIGS. 1 and 2, the support 32 is a bar. One of ordinary skill in the art would recognize from the present disclosure that alternative types of supports can be used. Each finger of the plurality of fingers 30 includes a first finger end 34 and an opposite, second finger end 36. The fingers 30 in FIGS. 1 and 2 are illustrated as having a fin-shaped profile. One of ordinary skill in the art would recognize from the present disclosure that alternative shapes and profiles for the fingers 30 can be used.

The first finger ends 34 extend toward a conveying surface of the conveyor 20, and are configured to engage the product 50 being transported along the conveyor 20. The second finger ends 36 extend away from the surface of the conveyor 20, and are preferably enlarged compared to the first finger ends 34. The second finger ends 36 are configured to trigger the sensor 40. The plurality of fingers 30 preferably includes at least two fingers. In the embodiments of FIGS. 1 and 2, the plurality of fingers 30 includes seven fingers. One of ordinary skill in the art would recognize that the number of fingers 30 can be varied.

In one embodiment, the plurality of fingers 30 extend laterally across a majority of the conveying surface of the conveyor 20. The plurality of fingers 30 each move independently from one another. The plurality of fingers 30 are laterally spaced from each other along the support 32. In one embodiment, the first finger ends 34 extend into a respective gap of the plurality of gaps 28 defined between adjacent conveying bands 26. This arrangement ensures that the fingers 30 contact the product 50 regardless of its thickness.

The single sensor 40 is arranged above the conveyor 20. Contact between the leading edge 52 of the product 50 moving along the conveyor 20 and at least one of the first finger ends 34 causes a corresponding one of the second finger ends 36 to trigger the single sensor 40. As the leading edge 52 of the product 50 engages the first finger end 34, the corresponding second finger end 36 pivots about the support 32 and triggers the single sensor 40. The single sensor 40 is preferably a break beam sensor. One of ordinary skill in the art would recognize from the present disclosure that alternative types of sensors can be used. The single sensor 40 can provide an input signal or data to a controller, CPU, or processor regarding the product's position.

Figure 3:
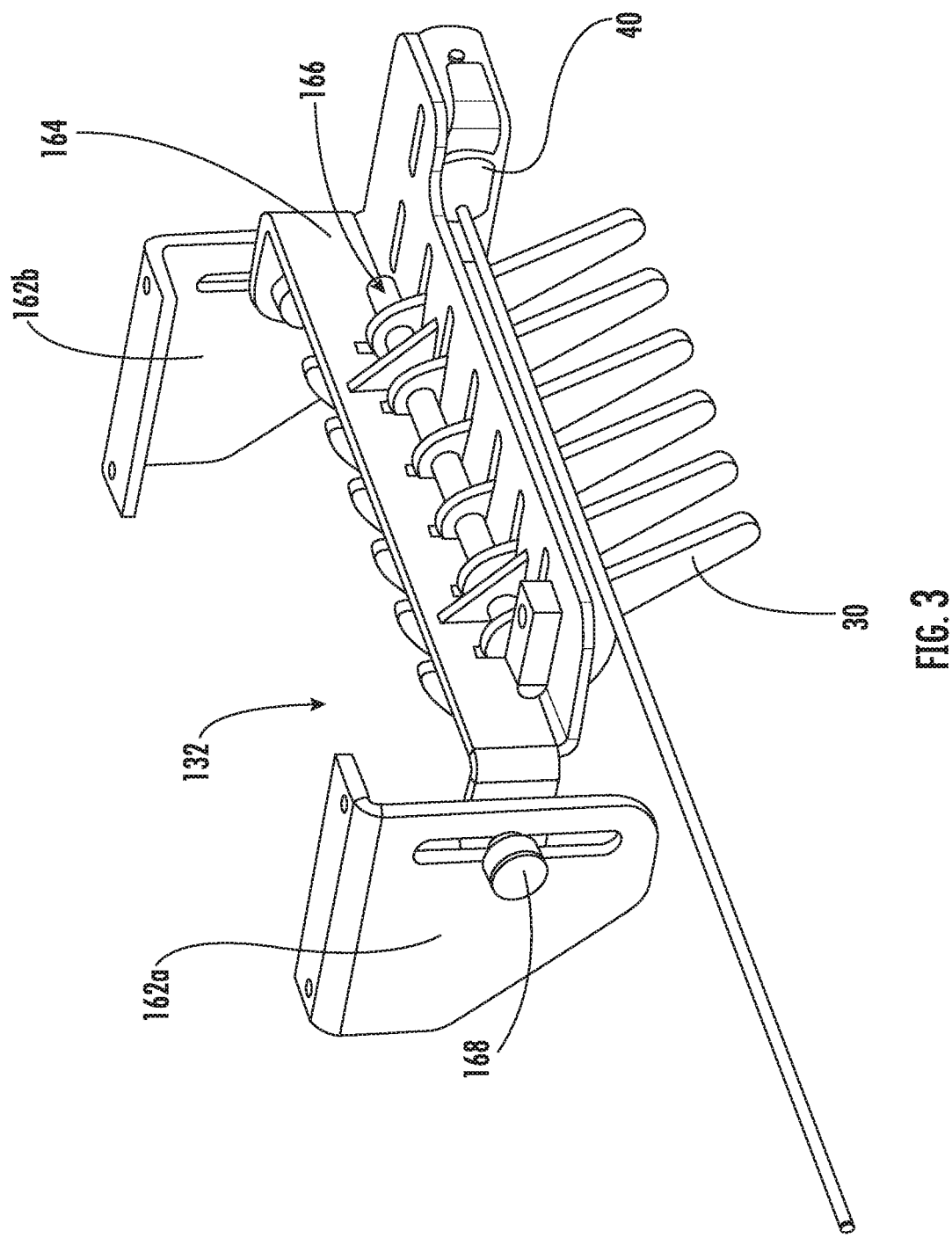
FIG. 3 is a front perspective view of an alternative embodiment of a support for the conveyor arrangement.

An alternative embodiment of a support 132 is illustrated in FIG. 3. This support 132 includes a frame with two mounting brackets 162a, 162b and a crossbar 164 extending between the two mounting brackets 162a, 162b. A pivoting bar 166 is arranged on the support 132 on which the plurality of fingers 30 are pivotally mounted. A height adjustment mechanism 168 is provided for raising or lowering the crossbar 164, the pivoting bar 166, and the plurality of finger 30 relative to a conveyor surface. One of ordinary skill in the art would recognize from the present disclosure that other types of support can be used for arranging the plurality of fingers above the conveyor surface.

Having thus described various embodiments of the present conveyor sensor arrangement in detail, it is to be appreciated and will be apparent to those skilled in the art that many changes, only a few of which are exemplified in the detailed description above, could be made in the conveyor sensor arrangement without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A conveyor sensor arrangement comprising:
   a conveyor having a plurality of sections, each section of the plurality of sections configured to move a product from a first conveyor end to a second conveyor end in a conveying direction such that a product can proceed along the conveyor at a plurality of lateral positions upon the conveyor;
   a plurality of fingers pivotally arranged on a support positioned above the conveyor and arranged perpendicular to the conveying direction, each said finger of the plurality of fingers includes a first finger end and a second finger end, the first finger ends extending toward a surface of the conveyor; and
   a single sensor arranged above the conveyor, wherein contact between a leading edge of a product moving along the conveyor in any of the plurality of lateral positions upon the conveyor and at least one of the first finger ends causes a corresponding one of the second finger ends to trigger the single sensor.

2. The conveyor sensor arrangement of claim 1, wherein the conveyor includes a plurality of conveying bands extending between the first conveyor end and the second conveyor end, and collectively establishing the plurality of lateral positions upon the conveyor the plurality of conveying bands defining a plurality of gaps therebetween, and each first finger end of the plurality of first fingers extend into a respective one of the plurality of gaps defined between adjacent conveying bands.

3. The conveyor sensor arrangement of claim 1, wherein the second finger ends are enlarged compared to the first finger ends.

4. The conveyor sensor arrangement of claim 1, wherein the single sensor is a break beam sensor, and the break beam sensor extends in a direction perpendicular to the conveying direction.

5. The conveyor sensor arrangement of claim 1, wherein the plurality of fingers includes at least two fingers.

6. The conveyor sensor arrangement of claim 1, wherein the plurality of fingers each move independently from one another.

7. The conveyor sensor arrangement of claim 1, wherein the plurality of fingers are laterally spaced from each other along the support.

8. The conveyor sensor arrangement of claim 1, wherein the support is a bar.

9. The conveyor sensor arrangement of claim 1, wherein the support includes a frame with two mounting brackets, a crossbar extending between the two mounting brackets, and a pivoting bar on which the plurality of fingers are mounted.

10. The conveyor sensor arrangement of claim 9, wherein the support includes a height adjustment mechanism to adjust a height of the crossbar, the pivoting bar, and the plurality of fingers relative to the surface of the conveyor.

* * * * *